United States Patent            (10) Patent No.: US 10,486,543 B2
Matsuo et al.                   (45) Date of Patent:     Nov. 26, 2019

(54) VOLTAGE CONTROL DEVICE FOR FUEL-CELL VEHICLE

(71) Applicant: TOYOTA JIDOSHA KABUSHIKI KAISHA, Toyota-Shi, Aichi-Ken (JP)

(72) Inventors: Junichi Matsuo, Okazaki (JP); Akihiro Kamiya, Toyota (JP); Tomoya Ogawa, Okazaki (JP); Shinji Aso, Toyota (JP); Tatsuya Fukami, Toyota (JP); Takao Watanabe, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 15/791,807

(22) Filed: Oct. 24, 2017

(65) Prior Publication Data

US 2018/0111502 A1    Apr. 26, 2018

(30) Foreign Application Priority Data

Oct. 25, 2016 (JP) .................................. 2016-208814
Oct. 24, 2017 (JP) .................................. 2017-204940

(51) Int. Cl.
 *B60L 11/18*  (2006.01)
 *B60L 1/00*   (2006.01)
 (Continued)

(52) U.S. Cl.
 CPC ............ *B60L 11/1881* (2013.01); *B60L 1/00* (2013.01); *B60L 50/40* (2019.02); *B60L 58/30* (2019.02);
 (Continued)

(58) Field of Classification Search
 CPC .. B60L 50/40; B60L 58/30; B60L 1/00; B60L 2240/14; H01M 8/04537; H01M 2250/20; F04B 35/04; F04B 49/06; F04B 2207/00; Y02T 10/7022; Y02T 90/32; Y02T 90/34
 (Continued)

(56) References Cited

U.S. PATENT DOCUMENTS

2008/0245588 A1* 10/2008 Wake ................ H01M 8/04179
                                                    180/65.31
2008/0248351 A1* 10/2008 Wake ................ H01M 8/04097
                                                    429/413
(Continued)

FOREIGN PATENT DOCUMENTS

JP      2011-211770 A    10/2011
JP      2012-244714 A    12/2012

*Primary Examiner* — Tuan C To
(74) *Attorney, Agent, or Firm* — Oliff PLC (57) ABSTRACT

Provided is a voltage control device of a fuel-cell vehicle capable of securing good acceleration responsiveness while suppressing battery deterioration even when a vehicle acceleration request is made in the situation where the output from a battery is restricted. When determining that electric power suppliable from a secondary battery to an air compressor is less than a lower limit of an acceleration maintaining-electric power of the air compressor, a voltage control device of a fuel-cell vehicle maintains a state where electric power generated by a fuel cell is consumed by an electric power drive, and supplies the electric power consumed by the electric power drive to the air compressor when a vehicle acceleration request is made.

6 Claims, 9 Drawing Sheets

(51) Int. Cl.
*B60L 11/00* (2006.01)
*H01M 8/04537* (2016.01)
*B60L 50/40* (2019.01)
*B60L 58/30* (2019.01)
*F04B 35/04* (2006.01)
*F04B 49/06* (2006.01)

(52) U.S. Cl.
CPC ..... *H01M 8/04537* (2013.01); *B60L 2240/14* (2013.01); *F04B 35/04* (2013.01); *F04B 49/06* (2013.01); *F04B 2207/00* (2013.01); *H01M 2250/20* (2013.01); *Y02T 10/7022* (2013.01); *Y02T 90/32* (2013.01); *Y02T 90/34* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2009/0166114 | A1* | 7/2009 | Taguchi | H02M 3/156 180/65.265 |
| 2010/0112401 | A1* | 5/2010 | Noto | H01M 8/04223 702/63 |
| 2010/0143757 | A1* | 6/2010 | Takagi | H01M 8/04223 429/429 |
| 2011/0032733 | A1* | 2/2011 | Watanabe | H02J 1/10 363/21.14 |
| 2014/0113161 | A1* | 4/2014 | Katano | B60L 1/003 429/9 |
| 2014/0156128 | A1* | 6/2014 | Wake | B60L 1/003 701/22 |
| 2014/0295305 | A1* | 10/2014 | Wake | H01M 8/04223 429/429 |

* cited by examiner

VOLTAGE CONTROL DEVICE FOR FUEL-CELL VEHICLE

INCORPORATION BY REFERENCE

The disclosure of Japanese Patent Application No. 2017-204940 filed on Oct. 24, 2017 including the specification, drawings and abstract is incorporated herein by reference in its entirety.

BACKGROUND

1. Technical Field

The present invention relates to a voltage control device for a fuel-cell vehicle.

2. Description of Related Art

A fuel-cell automobile (referred to as a fuel-cell vehicle below, where appropriate) incorporating a fuel cell (referred to as an FC below, where appropriate) as a power unit has been proposed, the fuel cell being configured to cause a chemical reaction between hydrogen that is fuel gas and oxygen in the air that is oxidant gas to generate electric power. The fuel-cell vehicle generally incorporates a battery (secondary battery) as a chargeable and dischargeable electric storage device. The battery is used for such purposes as supplying electric power to a drive motor when electric power supply from the fuel cell is not available at such occasions as the start-up of the system, and storing a surplus of the generated electric power of the fuel cell.

The air supplied to the fuel cell is taken in from outside air and is pumped by an on-vehicle air compressor (referred to as an ACP below, where appropriate). The air compressor is configured to regulate the amount of air supplied to the fuel cell when a motor incorporated in the air compressor as a driving source is controlled in accordance with the operating state of the fuel cell. The hydrogen supplied to the fuel cell is regulated when, for example, the opening amount of an electromotive on-off valve is controlled, the on-off valve being provided in the middle of a hydrogen channel that connects an on-vehicle hydrogen tank and the fuel cell.

It is known that the fuel-cell vehicle, which incorporates the fuel cell that generates electric power through a chemical reaction between the fuel gas and the oxidant gas, performs idle power generation suppression that suppresses power generation of the fuel cell in accordance with, for example, the value of vehicle speed in order to improve fuel efficiency (see, for example, Japanese Patent Application Publication No. 2012-244714). In JP 2012-244714 A, the idle power generation suppression, which adjusts the operation amount of reactant gas supply means to be smaller than that in normal operation, is performed in two stages. The idle power generation suppression is executed in accordance with the magnitude of the vehicle speed, so that the fuel efficiency can be improved, while deficiency in supplied electric power can be prevented.

SUMMARY

Incidentally, in an early stage of vehicle acceleration, the air compressor is generally driven by using the electric power from the battery. However, when the output of the battery is restricted in such situations where temperature is low or where the state of battery (SOC) is at a low level, the electric power necessary for accelerating the air compressor is not sufficiently provided. This may delay the start (start-up) of increasing the generation power of the fuel cell, and cause delay in acceleration timing of the drive motor. As a solution for the problem, it is considered to secure the driving force of the drive motor in an early stage of vehicle acceleration by setting the fuel cell in a power generation standby state. In this case, however, there is a possibility that the battery may be excessively charged and so the cell may be deteriorated.

The present disclosure provides a voltage control device for a fuel-cell vehicle capable of securing good acceleration responsiveness while suppressing battery deterioration even when a vehicle acceleration request is made in the situation where the output from the battery is restricted.

A first aspect of the present disclosure relates to a voltage control device for a fuel-cell vehicle including a fuel cell and a secondary battery as a power supply source for a drive motor that drives the vehicle. The voltage control device includes: an air compressor configured to supply air to the fuel cell; and a control unit configured to control electric power generated by the fuel cell. When the control unit determines that electric power suppliable from the secondary battery to the air compressor is less than a lower limit of an acceleration maintaining-electric power of the air compressor, the control unit maintains a state where the electric power generated by the fuel cell is consumed by an electric power drive provided in the vehicle, and supplies the electric power to be consumed by the electric power drive to the air compressor when a vehicle acceleration request is made.

According to the configuration, when a vehicle acceleration request is made, the electric power consumed in the electric power drive is supplied to the air compressor. Accordingly, even in the situation where the output from the secondary battery is restricted, the start-up of the increase in generation power of the fuel cell (the amount of electric power generated by the fuel cell) is accelerated. Consequently, the acceleration timing of the drive motor can be advanced. Since the generated electric power is consumed in the electric power drive, excessive charging of the secondary battery can be suppressed even when the state of power generation of the fuel cell is maintained. This can curb deterioration in the secondary battery.

The electric power drive may be an auxiliary machine, and the control unit may reduce an amount of electric power consumption of the auxiliary machine and supply electric power corresponding to an amount of the reduction of the electric power consumption to the air compressor so as to accelerate the air compressor, when the vehicle acceleration request is made.

The electric power generated by the fuel cell is consumed by the auxiliary machine, and when a vehicle acceleration request is made, the amount of the electric power consumption in the auxiliary machine is reduced, and the electric power corresponding to the amount of the reduction of the electric power consumption is supplied to the air compressor to accelerate the air compressor. Accordingly, when the vehicle acceleration request is made, acceleration of the air compressor can be started at an early stage by using the electric power consumed in the auxiliary machine. As a consequence, the electric power generated in the fuel cell can be supplied to the drive motor at an early stage, so that the acceleration timing of the drive motor can be advanced.

The electric power drive may be the air compressor, and the control unit may reduce an opening amount of a valve provided in a bypass channel that connects a cathode inlet-side channel and a cathode outlet-side channel of the fuel cell while bypassing the fuel cell, when the vehicle acceleration request is made.

Reducing the opening of the valve provided in the bypass channel bypassing the fuel cell makes it possible to increase the amount of gas supplied from the air compressor to the fuel cell. This makes it possible to increase the generated electric power of the fuel cell. Therefore, the electric power generated in the fuel cell can be supplied to the drive motor at an early stage, and the acceleration timing of the drive motor can be advanced.

The control unit may reduce the electric power supplied from the fuel cell to the air compressor and supply electric power corresponding to the amount of the reduction of the electric power from the fuel cell to the drive motor, when the vehicle acceleration request is made.

When an acceleration request is made, the electric power corresponding to the amount of the reduction of the electric power supplied to the air compressor is supplied from the fuel cell to the drive motor. Accordingly, the acceleration timing of the drive motor can be advanced.

A second aspect of the present disclosure relates to a voltage control device for a fuel-cell vehicle including a fuel cell and a secondary battery as a power supply source for a drive motor that drives the vehicle. The voltage control device includes: an air compressor configured to supply air to the fuel cell; a capacitor capable of retaining electric power necessary for acceleration of the air compressor; and a control unit configured to control electric power generated by the fuel cell. When the control unit determines that electric power suppliable from the secondary battery to the air compressor is less than a lower limit of an acceleration maintaining-electric power of the air compressor, the control unit maintains the capacitor in a step-up state, and supplies the stepped-up electric power of the capacitor to the air compressor so as to accelerate the air compressor, when a vehicle acceleration request is made.

When a vehicle acceleration request is made, the stepped-up electric power of the capacitor is supplied to the air compressor, and therefore the acceleration timing of the air compressor can be advanced. Accordingly, the electric power generated in the fuel cell can be supplied to the drive motor at an early stage. Use of the electric power of the capacitor can suppress excessive charging of the secondary battery as in the conventional case where the fuel cell is kept in a power generation standby state. Hence, secondary battery deterioration can be suppressed.

A third aspect of the present disclosure relates to a voltage control device for a fuel-cell vehicle including a fuel cell and a secondary battery as a power supply source for a drive motor that drives the vehicle. The voltage control device includes: an air compressor configured to supply air to the fuel cell; an auxiliary machine configured to consume electric power generated by the fuel cell; and a control unit programmed to control electric power generated by the fuel cell. When the control unit determines that electric power suppliable from the secondary battery to the air compressor is less than a lower limit of an acceleration maintaining-electric power of the air compressor, the control unit is programmed to cause at least one of the air compressor and the auxiliary machine to consume the electric power generated by the fuel cell, and use the consumed electric power for acceleration of the air compressor when a vehicle acceleration request is made.

The present disclosure can provide a voltage control device for a fuel-cell vehicle capable of securing good acceleration responsiveness while suppressing battery deterioration even when a vehicle acceleration request is made in the situation where the output from the battery is restricted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, embodiments of the present disclosure will be described with reference to the accompanying drawings. The description of the preferred embodiments below are merely illustrative and are not intended to limit the present disclosure, applications thereof, or the use thereof.

Figure 1:
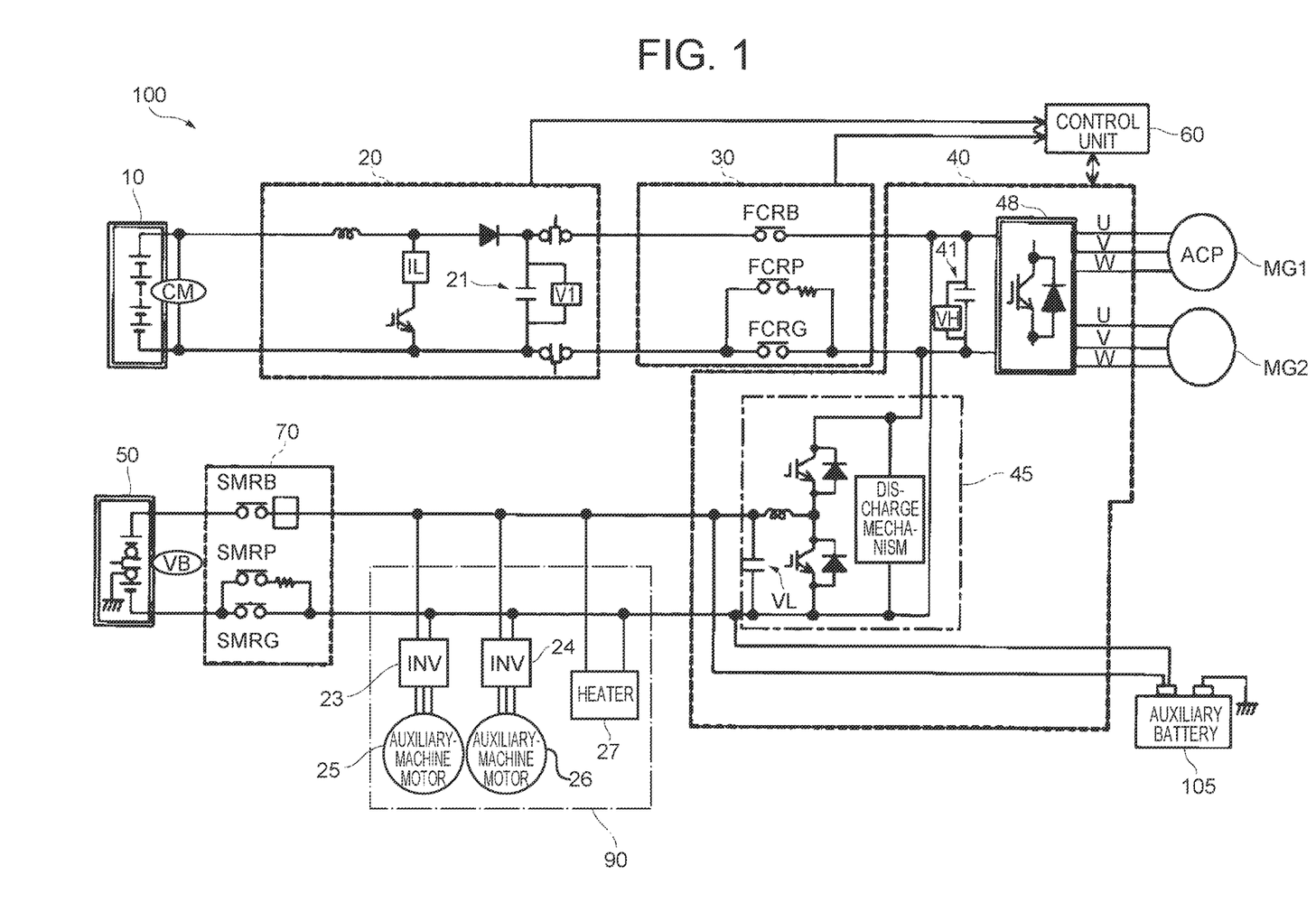
FIG. 1 is a schematic configuration view of a voltage control device for a fuel-cell vehicle in the present embodiment.

First, the configuration of the voltage control device for a fuel-cell vehicle in the present embodiment will be described. FIG. 1 is a schematic configuration view of the voltage control device for a fuel-cell vehicle in the present embodiment.

As illustrated in FIG. 1, a voltage control device 100 for a fuel-cell vehicle (also simply referred to as a voltage control device 100 below) includes a fuel cell 10, a FC step-up converter 20, a FC relay circuit 30, a power control unit (PCU) 40, a secondary battery 50, a control unit 60, a secondary-battery relay circuit 70, an auxiliary battery 105, an air compressor MG1, and a drive motor (traction motor) MG2.

The fuel cell 10 is a cell that generates electric power through reaction between hydrogen and oxygen as reactant gas. The vehicle incorporating the voltage control device 100 has a hydrogen tank (not illustrated) that stores hydrogen as a reactant gas. Hydrogen is supplied to the fuel cell 10 from the hydrogen tank. Air in the atmosphere is compressed with the air compressor MG1, and oxygen as reactant gas is supplied to the fuel cell 10 from the air compressor MG1. The details of an oxidation gas supply system including the air compressor MG1 will be described later.

The FC step-up converter 20 is a step-up converter that steps up the voltage output from the fuel cell 10 up to the drive voltage of the air compressor MG1 and the traction motor MG2. The FC step-up converter 20 has a first capacitor 21 that can store electric charge. The first capacitor 21 is connected in parallel with a first voltmeter V1 that measures the voltage of the first capacitor 21. The traction motor MG2 is a motor that drives tires of the vehicle incorporating the voltage control device 100 to allow the vehicle to travel. The traction motor MG2 is driven with the electric power supplied from the fuel cell 10 or the secondary battery 50.

The FC relay circuit 30 is a circuit that switches electric connection and disconnection between the FC step-up converter 20 and the PCU 40. As illustrated in FIG. 1, the FC relay circuit 30 is disposed between the FC step-up converter 20 and the PCU 40. The FC relay circuit 30 has an FC first main relay FCRB, an FC second main relay FCRG that is a counterpart of the FC first main relay FCRB, and an FC precharge relay FCRP connected in parallel with the FC second main relay FCRG. The FC precharge relay FCRP has polarity, and when the electric potential at the side of the PCU 40 is higher than the electric potential at the side of the FC step-up converter 20, the FC precharge relay FCRP can be energized.

The details of the timing of opening and closing the circuits in the FC relay circuit 30 will be described later. At the start-up of the voltage control device 100, the FC first main relay FCRB is first closed, then the FC precharge relay FCRP is closed, and after a second capacitor 41 is charged, the FC second main relay FCRG is closed. At the end of the power generation of the fuel cell 10 in the voltage control device 100, the relays in the FC relay circuit 30 are each opened in an order reverse to the order when the voltage control device 100 is started-up.

The PCU 40 controls the amount of electric power transmitted to each unit of the voltage control device 100 based on a control signal transmitted from the control unit 60. The PCU 40 has the second capacitor 41, a step-up intelligent power module (IPM) 45, and an IPM 48. The second capacitor 41 is a smoothing power storage unit. The second capacitor 41 is connected in parallel with a second voltmeter VH that measures the voltage of the second capacitor 41. The step-up IPM 45 is a converter that steps up the voltage of the electric power supplied from the secondary battery 50. The IPM 48 is a power module connected to the air compressor MG1 and the traction motor MG2 that are electric loads.

The secondary battery 50 is a cell that temporarily stores electric power obtained through power generation of the fuel cell 10 and regenerative power of the traction motor MG2. The electric power stored in the secondary battery 50 is used as drive power of each component constituting the voltage control device 100.

The control unit 60 is a computer system that controls operation of various equipment of the voltage control device 100. For example, even when there is no acceleration request, the control unit 60 does not stop power generation of the fuel cell 10, but controls such that the generated electric power is consumed in the auxiliary machine (including a hydrogen pump, a coolant pump, and a heater). Upon reception of the acceleration request signal, the control unit 60 controls to reduce the electric power consumption of the auxiliary machine, and to supply the electric power corresponding to the amount of the reduction of the electric power consumption to the air compressor for acceleration of the air compressor or to the drive motor. The details of a control flow executed by the control unit 60 will be described with reference to a later-described flowchart.

The secondary-battery relay circuit 70 is a relay circuit that switches electric connection and disconnection between the secondary battery 50 and the PCU 40. The secondary-battery relay circuit 70 has a secondary-battery first main relay SMRB, a secondary-battery second main relay SMRG that is a counterpart of the secondary-battery first main relay SMRB, and a secondary-battery precharge relay SMRP connected in parallel with the secondary-battery second main relay SMRG.

At the start-up of the voltage control device 100, the control unit 60 first closes the secondary-battery first main relay SMRB, and then closes the secondary-battery precharge relay SMRP, and after charging a step-up IPM capacitor VL included in the step-up IPM 45, closes the secondary-battery second main relay SMRG. At the end of the power generation of the fuel cell 10 in the voltage control device 100, the control unit 60 opens each relay in the secondary-battery relay circuit 70 in an order reverse to the order when the voltage control device 100 is started-up.

The auxiliary battery 105 is an auxiliary machine cell that temporarily stores the electric power supplied from the secondary battery 50. The electric power stored in the auxiliary battery 105 is used to drive the auxiliary machine.

An auxiliary consumable device 90 is a device that can consume the electric power generated in the fuel cell 10. The auxiliary consumable device 90 has auxiliary motors 25, 26, auxiliary inverters 23, 24, and a heater 27. The auxiliary motor 25 is a motor that drives a hydrogen pump for circulating hydrogen off-gas discharged from the hydrogen gas channel of the fuel cell 10 to the fuel cell 10. The auxiliary motor 26 is a motor that drives a coolant pump for circulating a coolant used for temperature control of the fuel cell 10. The auxiliary inverters 23, 24 convert direct current into a three-phase alternating current and supply the three-phase alternating current to the auxiliary motors 25, 26, respectively. The "auxiliary machine" that consumes electric power in the present embodiment is not limited to such examples as the auxiliary motors 25, 26, the auxiliary inverters 23, 24, and the heater 27, but includes other devices that can consume electric power.

Figure 2:
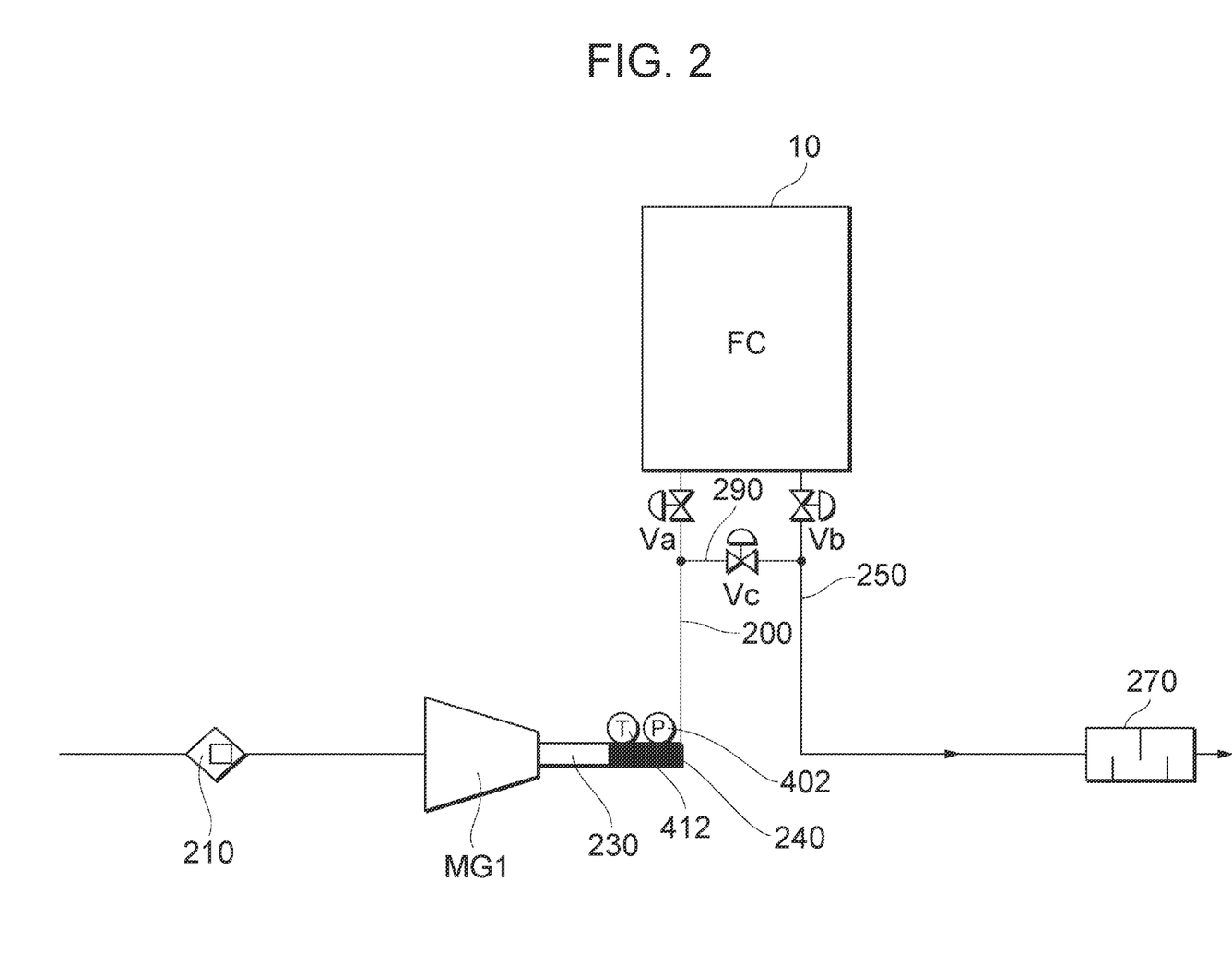
FIG. 2 is a schematic configuration view of an oxidation gas supply system that supplies air to a fuel cell illustrated in FIG. 1.

A description is now given of the configuration of the oxidation gas supply system that supplies oxidation gas (also referred to as air below) to the fuel cell 10. FIG. 2 illustrates the schematic configuration of the oxidation gas supply system. The fuel cell 10 generates electric power through an electrochemical reaction caused by supplying hydrogen to an anode electrode as fuel gas and supplying air or oxygen to a cathode electrode as oxidation gas. In FIG. 2, systems normally provided in the fuel cell system, such as a fuel gas supply system and a cooling system, are omitted.

The oxidation gas supply system illustrated in FIG. 2 includes an oxidation gas supply pipe 200, an air cleaner 210, the air compressor MG1 (referred to as an ACP below, where appropriate), an intercooler 230, a resonator 240, an oxidation gas discharge pipe 250, a muffler 270, a bypass pipe 290, and regulation valves Va, Vb, Vc.

The oxidation gas supply pipe 200 is a channel that supplies oxidation gas to the cathode side of the fuel cell 10. The oxidation gas supply pipe 200 is provided with the air cleaner 210, the air compressor MG1, the intercooler 230, the resonator 240, the regulation valve Va, and various sensors (such as a pressure sensor 402 and a temperature sensor 412).

The air cleaner 210 removes waste and dust in the air taken in from the atmosphere. The air cleaner 210 is provided with sensors, such as a pressure sensor that measures the atmospheric pressure of the sucked air, and an airflow meter that measures an air flow rate.

The air compressor MG1 compresses air and supplies the compressed air to the fuel cell 10. The intercooler 230 provided on the downstream side of the air compressor MG1 cools the air whose temperature is raised by compression. The resonator 240 reduces a suction noise.

The regulation valve Va is an electro-magnetic valve provided on the upstream side of the fuel cell 10 to regulate the supply amount of the oxidation gas supplied to the fuel cell 10. When the regulation valve Va is opened, the compressed air (oxidation gas) compressed through the air compressor MG1 is supplied to the cathode electrode of the fuel cell 10.

The oxidation gas discharge pipe 250 is a channel connected to the downstream side of the fuel cell 10 to discharge oxidization off-gas from the fuel cell 10. The oxidation gas discharge pipe 250 is provided with the regulation valve Vb and the muffler 270. The regulation valve Vb is an electro-magnetic valve provided on the downstream side of the fuel cell 10 to regulate the flow rate of the oxidization off-gas discharged from the fuel cell 10. When the regulation valve Vb is opened, the oxidization off-gas from the fuel cell 10 flows through the oxidation gas discharge pipe 250, and is discharged through the muffler 270.

The bypass pipe 290 is a channel that carries the oxidation gas from the oxidation gas supply pipe 200 to the oxidation gas discharge pipe 250 while bypassing the fuel cell 10.

The bypass pipe 290 is equipped with a regulation valve Vc (bypass valve). The flow rate of the oxidation gas flowing through the bypass pipe 290 can be regulated by opening amount regulation of the regulation valve Vc. When the regulation valve Vc is opened and the regulation valves Va, Vb are closed, the oxidation gas flowing through the oxidation gas supply pipe 200 flows into the oxidation gas discharge pipe 250, without passing through the fuel cell 10, and is discharged through the muffler 270. When the regulation valve Vc is closed or the opening amount of the regulation valve Vc is reduced from the state where all of the regulation valves Va, Vb, Vc are opened, the amount of air supplied to the fuel cell 10 can be increased without the electric power consumption of the air compressor MG1 being increased. In the present embodiment, when the vehicle acceleration request is not present, all the regulation valves Va, Vb, Vc are put in an opened state, the speed of the air compressor MG1 is maintained at the level (an approximate numeric value of electric power consumption of the air compressor necessary when the vehicle acceleration request is made) when the vehicle acceleration request is made, and air is discharged through the bypass pipe 290. Upon reception of the vehicle acceleration request, the control unit 60 closes the regulation valve Vc or reduces the opening amount of the regulation valve Vc to increase the amount of air supplied to the fuel cell 10. Thus, the generated electric power of the fuel cell 10 can be increased by adjusting the opening amount regulation of the regulation valve Vc without the electric power consumption of the air compressor MG1 being increased, and the generated electric power can be supplied to the drive motor.

Figure 3:
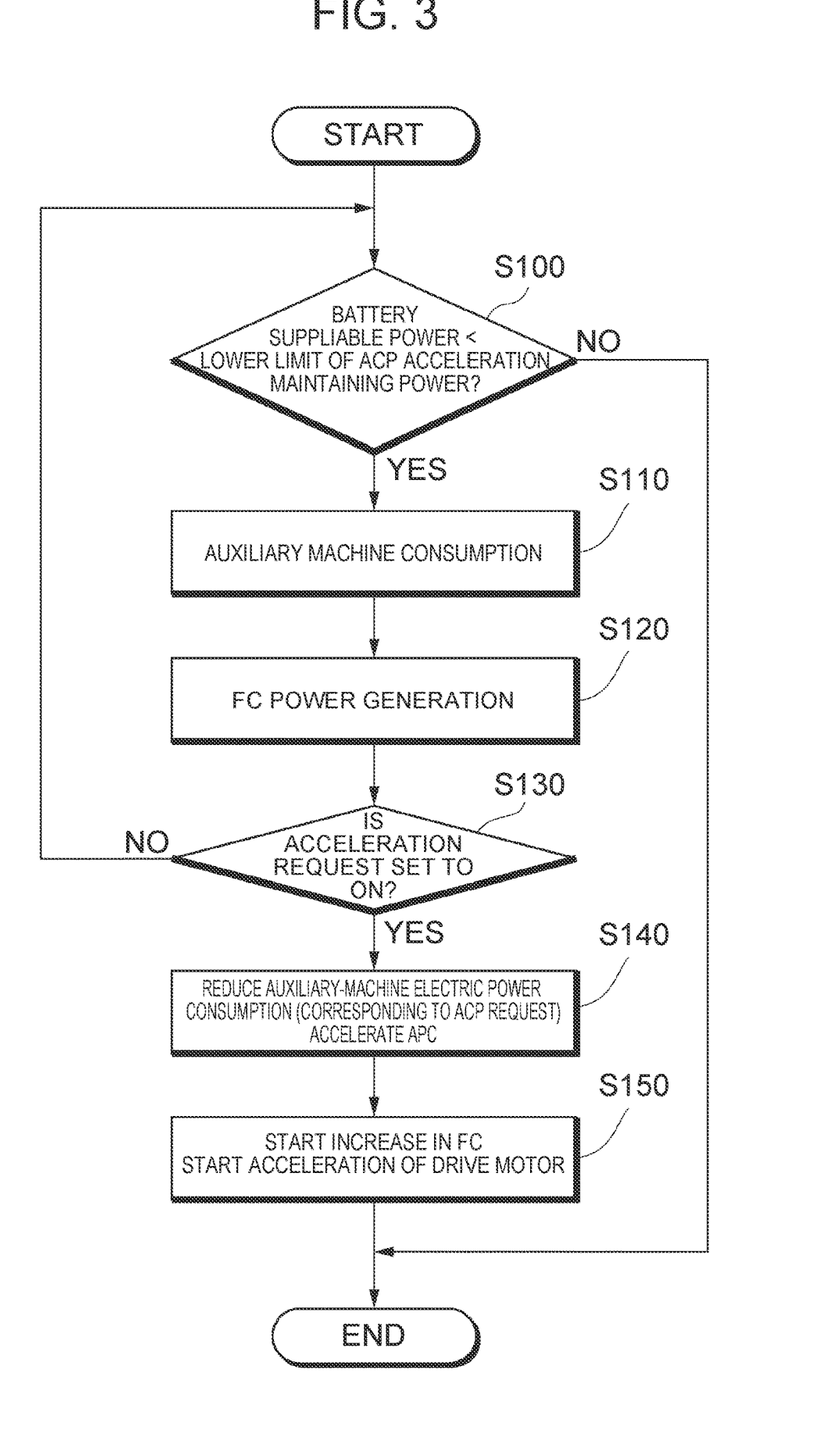
FIG. 3 is a flowchart illustrating one example of a control flow executed by a control unit illustrated in FIG. 1.
Figure 4:
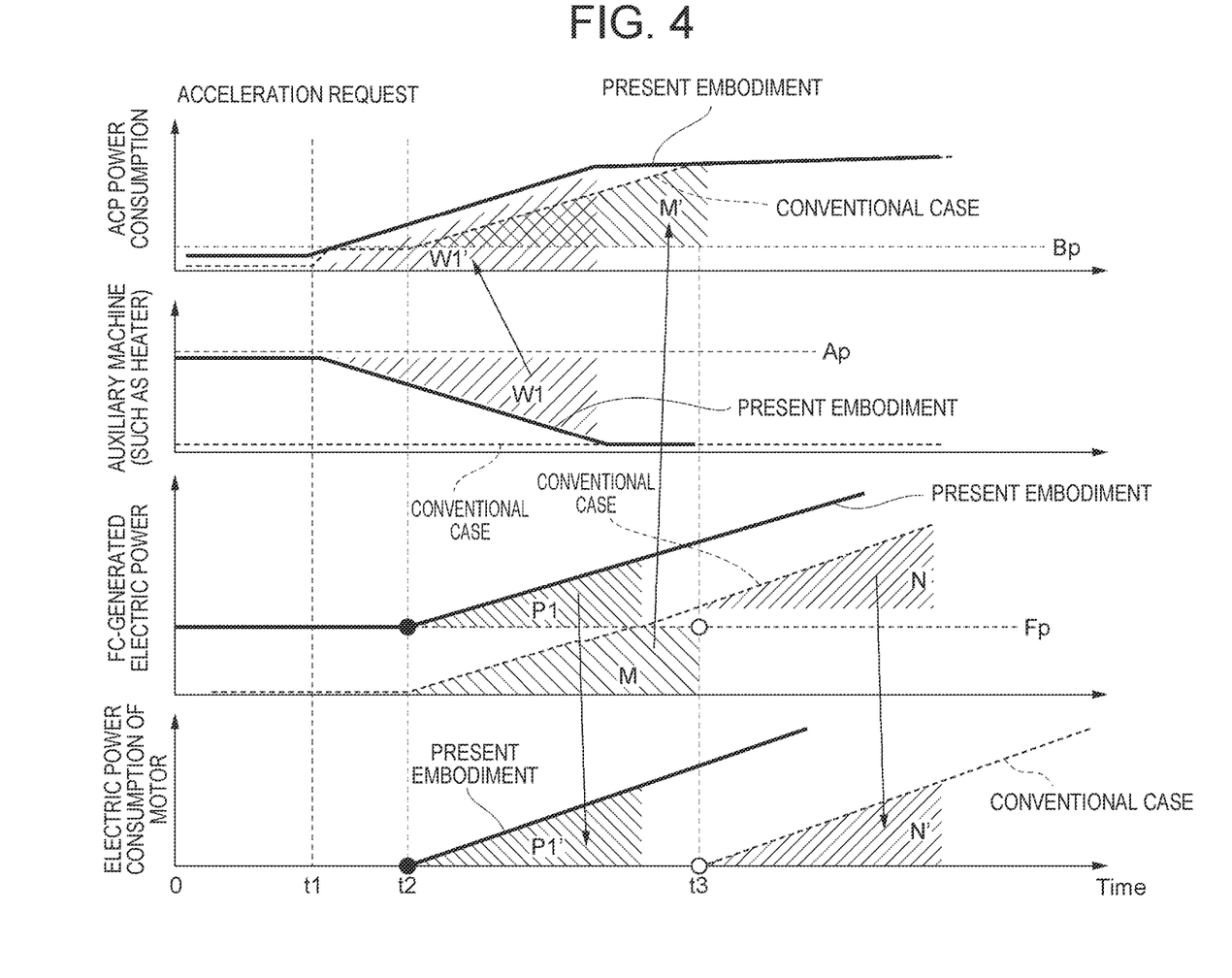
FIG. 4 is a time chart corresponding to the control flow illustrated in FIG. 3.

A description is now given of the control flow executed by the control unit 60. FIG. 3 is a flowchart illustrating an embodiment of the control flow executed by the control unit 60. FIG. 4 is a time chart corresponding to the control flow illustrated in FIG. 3, in the case where an acceleration request is made at time t1. In FIG. 4, a broken line Bp represents battery-suppliable electric power that is the electric power suppliable to the air compressor MG1 from the secondary battery 50. A broken line Ap represents auxiliary-machine electric power consumption, and a broken line Fp represents standby electric power (FC-generated electric power in the standby state).

First, in step S100 of FIG. 3, it is determined whether or not the electric power (battery-suppliable electric power) that the secondary battery 50 can supply to the air compressor is less than a lower limit of air compressor acceleration maintaining-electric power (a lower limit of ACP acceleration maintaining-electric power). When the battery suppliable-electric power is not less than the lower limit (step S100 (NO)), the control flow illustrated in FIG. 3 is ended. When the battery suppliable-electric power is less than the lower limit (step S100 (YES)), the processing proceeds to step S110. The "lower limit of air compressor acceleration maintaining-electric power" in this specification corresponds to a sum of the electric power for maintaining a stationary speed of ACP (minimum electric power for cancelling energy loss relating to ACP) and ACP inertia-electric power (optionally adopted in accordance with maximum requested acceleration of the vehicle).

Next, the control unit 60 maintains the electric power necessary for a vehicle acceleration request even before receiving the vehicle acceleration request. Specifically, as illustrated in steps S110 and S120 of FIG. 3 and in a period (0≤t≤t1) of FIG. 4, power generation of the fuel cell is not stopped even when the vehicle acceleration request is not yet made, and the auxiliary machine (such as a heater) is made to consume the electric power (FC—generated electric power Fp illustrated in FIG. 4) generated in the fuel cell (auxiliary-machine electric power consumption Ap illustrated in FIG. 4), and the device is put in a standby state. Specifically, in step S110, the electric power corresponding to an amount a value obtained by subtracting battery suppliable–electric power from lower limit of air compressor acceleration maintaining–electric power ((lower limit of air compressor acceleration maintaining–electric power) −(battery suppliable-electric power)) is consumed in the auxiliary machine (such as a heater). In step S120, the electric power in an amount corresponding to a value obtained by subtracting battery suppliable–power from lower limit of air compressor acceleration maintain–electric power ((lower limit of air compressor acceleration maintaining–electric power)–(battery suppliable-electric power)) is generated in the fuel cell. Thus, the state where the electric power drive (such as the auxiliary machine) provided in the vehicle is consuming the electric power generated in the fuel cell before the vehicle acceleration request is made or the state where the capacitor is maintained in a later-described step-up state before the vehicle acceleration request is made is referred to as "standby state" in this specification. In the case of generating electric power in the fuel cell before the vehicle acceleration request as in the present embodiment, it is necessary to consume the generated electric power to balance the amounts of generated and consumed electric power (power generation and consumption) in order to suppress cell capacity saturation and excessive power charging.

Next, in step S130 of FIG. 3, it is determined whether or not the vehicle acceleration request is made. The vehicle acceleration request in this specification includes acceleration at the time of starting the vehicle, acceleration from a constant vehicle speed, as well as acceleration from deceleration. When it is determined that the vehicle acceleration request is not present, the processing returns to step S100, and the process of steps S100 to S120 is repeated. When it is determined that the vehicle acceleration request is present (time t1 in FIG. 4), the processing proceeds to step S140.

Next, when it is determined that the vehicle acceleration request is present (step S130 (YES)), the electric power consumption of the auxiliary machine is reduced, and the electric power corresponding to the amount of the reduction of the electric power consumption of the auxiliary machine is supplied to the air compressor from the fuel cell as illustrated in step S140. That is, as illustrated in FIG. 4, the electric power consumption of the auxiliary machine is reduced such that the electric power corresponding to the amount of the reduction of the electric power consumption of the auxiliary machine (W1 illustrated in FIG. 4) is balanced with the electric power corresponding to the air compressor acceleration request (W1' illustrated in FIG. 4). Accordingly, in the conventional case (broken line illustrated in FIG. 4), the electric power consumption of the air compressor increases at time t2 that is later than time t1, whereas in the embodiment, the electric power consumption of the air compressor can be increased at time t1, i.e., upon reception of the vehicle acceleration request.

Next, in step S150 illustrated in FIG. 3, the increase in fuel cell-generated electric power is started (time t2 in FIG. 4), and the increase of the generated electric power (P1 illustrated in FIG. 4) is supplied to the drive motor (P1' illustrated in the electric power consumption of the motor in FIG. 4). Accordingly, as compared with the conventional case, acceleration timing of the drive motor can be advanced. Specifically, in the conventional case (broken line illustrated in FIG. 4), power generation in the fuel cell is not performed (i.e., power generation is not in the standby state) before the vehicle acceleration request is made. Accordingly, when the vehicle acceleration request is made, the FC-generated electric power is increased (M illustrated in FIG. 4), and the increased electric power is supplied to the air compressor (M' illustrated in FIG. 4). Based on the amount of the increase of the FC-generated electric power (N illustrated in FIG. 4) after the passage of specified time, acceleration of the drive motor is started at time t3 (t2<t3). Thus, in the conventional case, the electric power consumption of the drive motor increases at time t3 later than time t2, whereas in the embodiment, the electric power consumption of the drive motor increases at time t2, so that the acceleration timing of the drive motor can be advanced.

First Modification

Figure 5:
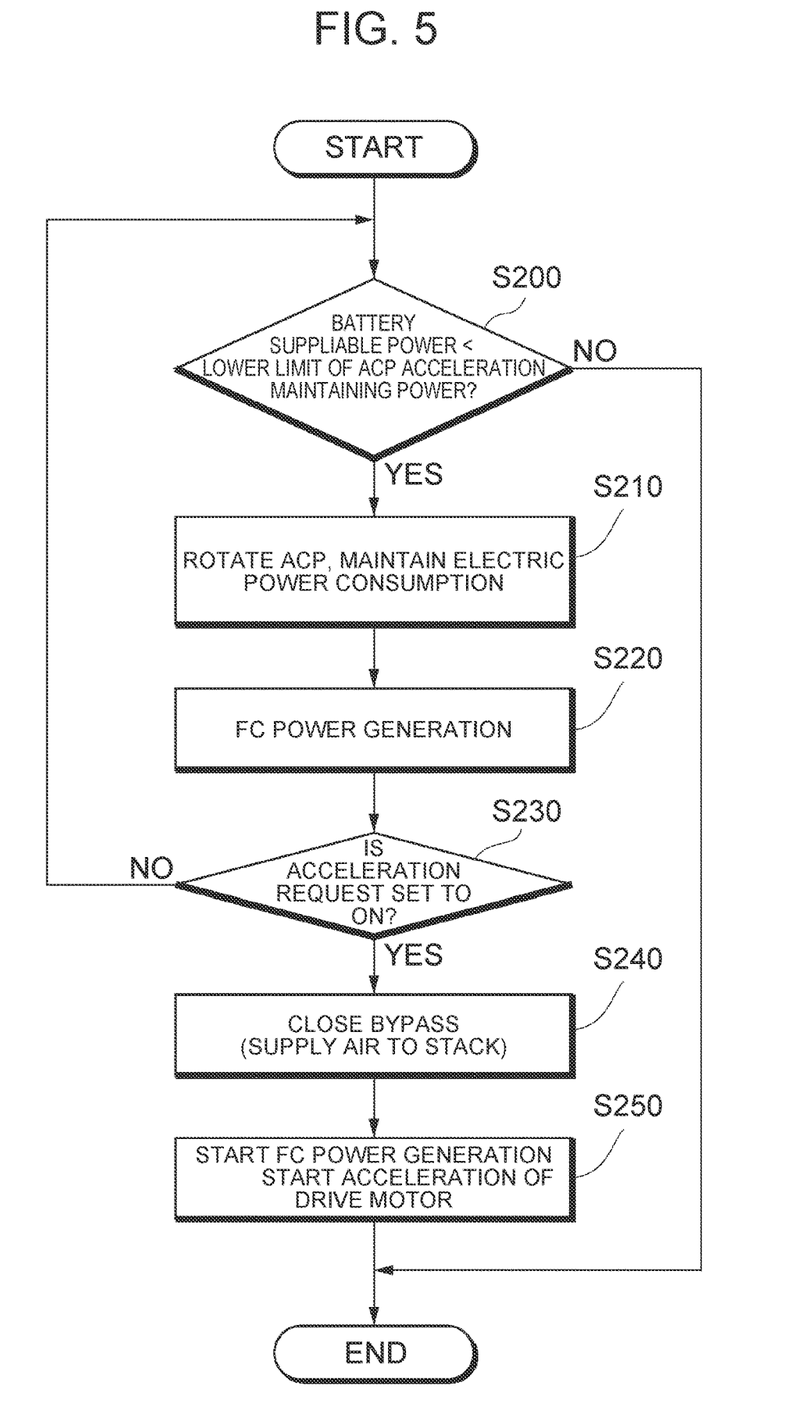
FIG. 5 is a flowchart illustrating a first modification of the control flow executed by the control unit illustrated in FIG. 1.
Figure 6A:
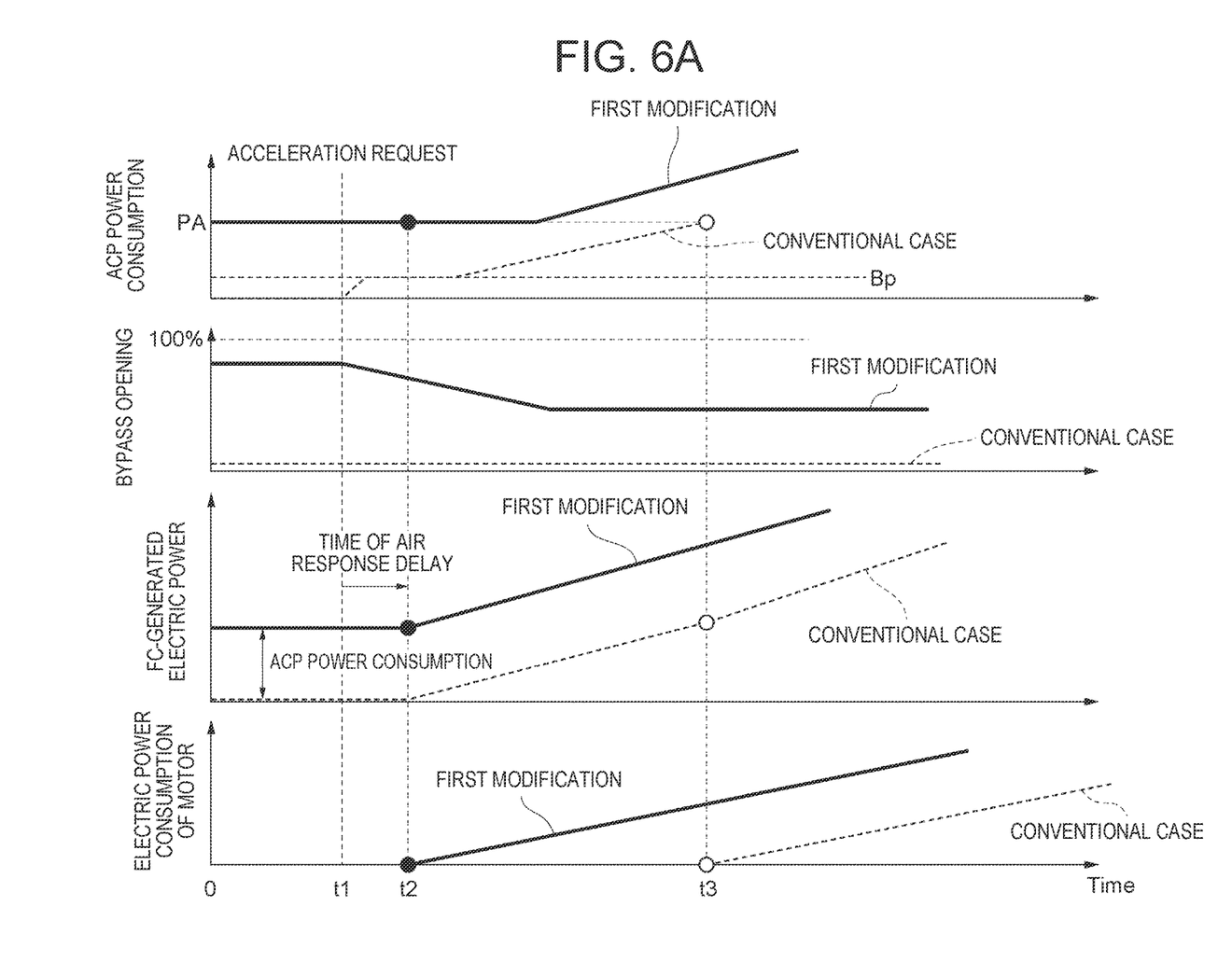
FIG. 6A is a time chart corresponding to the first modification.

The first modification which is different from the aforementioned control flow will now be described. FIG. 5 is a flow chart showing the first modification of the control flow executed by the control unit 60. FIG. 6A is a time chart corresponding to the control flow of FIG. 5. This first modification particularly differs from the control flow of the aforementioned embodiment in that it regulates bypass opening amount.

First, as illustrated in step S200 of FIG. 5, it is determined whether or not the electric power (battery suppliable electric power) that the secondary battery 50 (see FIG. 1) can supply to the air compressor is less than a lower limit of air compressor acceleration maintaining electric power (a lower limit of ACP acceleration maintaining electric power). When the battery suppliable electric power is not less than the lower limit (step S200 (NO)), the control flow illustrated in FIG. 5 is ended. When the battery suppliable electric power is less than the lower limit (step S200 (YES)), the processing proceeds to step S210.

Next, in step S210 of FIG. 5, before the vehicle acceleration request (in a period (0≤t≤t1) in FIG. 6A), the electric power from the fuel cell is used to rotate the air compressor, the electric power generated by the fuel cell is maintained (ACP consumption power is maintained at $P_A$ illustrated in FIG. 6A), and the air that is not needed to be supplied to the fuel cell is discharged from the bypass pipe 290 (see FIG. 2). In step S210, the air compressor is rotated such that the electric power in an amount corresponding to a value obtained by subtracting battery suppliable electric power from lower limit of the air compressor acceleration maintaining electric power (lower limit of the air compressor acceleration maintaining electric power)–(battery suppliable electric power) is consumed. In step S220, as illustrated in a period (0≤t≤t1) in the FC-generated electric power graph of FIG. 6A, the air is supplied to the fuel cell in proportion to the ACP consumption power, resulting in power generation in the fuel cell. In other words, in step S220, the electric power in an amount corresponding to a value obtained by subtracting battery suppliable electric power from lower limit of air compressor acceleration maintaining electric power (lower limit of air compressor acceleration maintaining electric power)–(battery suppliable electric power) is generated in the fuel cell.

Next, in step S230 of FIG. 5, it is determined whether or not the vehicle acceleration request is present. When it is determined that the vehicle acceleration request is not present, the processing returns to step S200, and steps S200 to S220 are repeated. When it is determined that the vehicle acceleration request is present (time t1 in FIG. 6A), the processing proceeds to step S240.

Next, as illustrated in step S240 of FIG. 5, the regulation valve Vc (bypass valve) provided on the bypass pipe 290 (see FIG. 2) that bypasses the fuel cell is closed or the opening amount of the regulation valve Vc is reduced, and air is supplied to the fuel cell.

Next, as illustrated in step S250 of FIG. 5 and FIG. 6A, the generation power of the fuel cell starts to be increased at time t2, and acceleration of the drive motor is started. As described in the foregoing, when the vehicle acceleration request is made, only the regulation valve Vc of the bypass pipe 290 (see FIG. 2) is closed or the opening amount of the regulation valve Vc is reduced so as to increase the generated electric power of the fuel cell without increasing the consumption electric power of the air compressor. Since responsiveness is better in the opening and closing control of the regulation valve Vc than in the control (where the electric power consumption in the auxiliary machine is reduced, and the corresponding electric power is supplied to the air compressor) described with reference to the flowchart of FIG. 3, acceleration of the drive motor can be started faster.

Second Modification

Figure 6B:
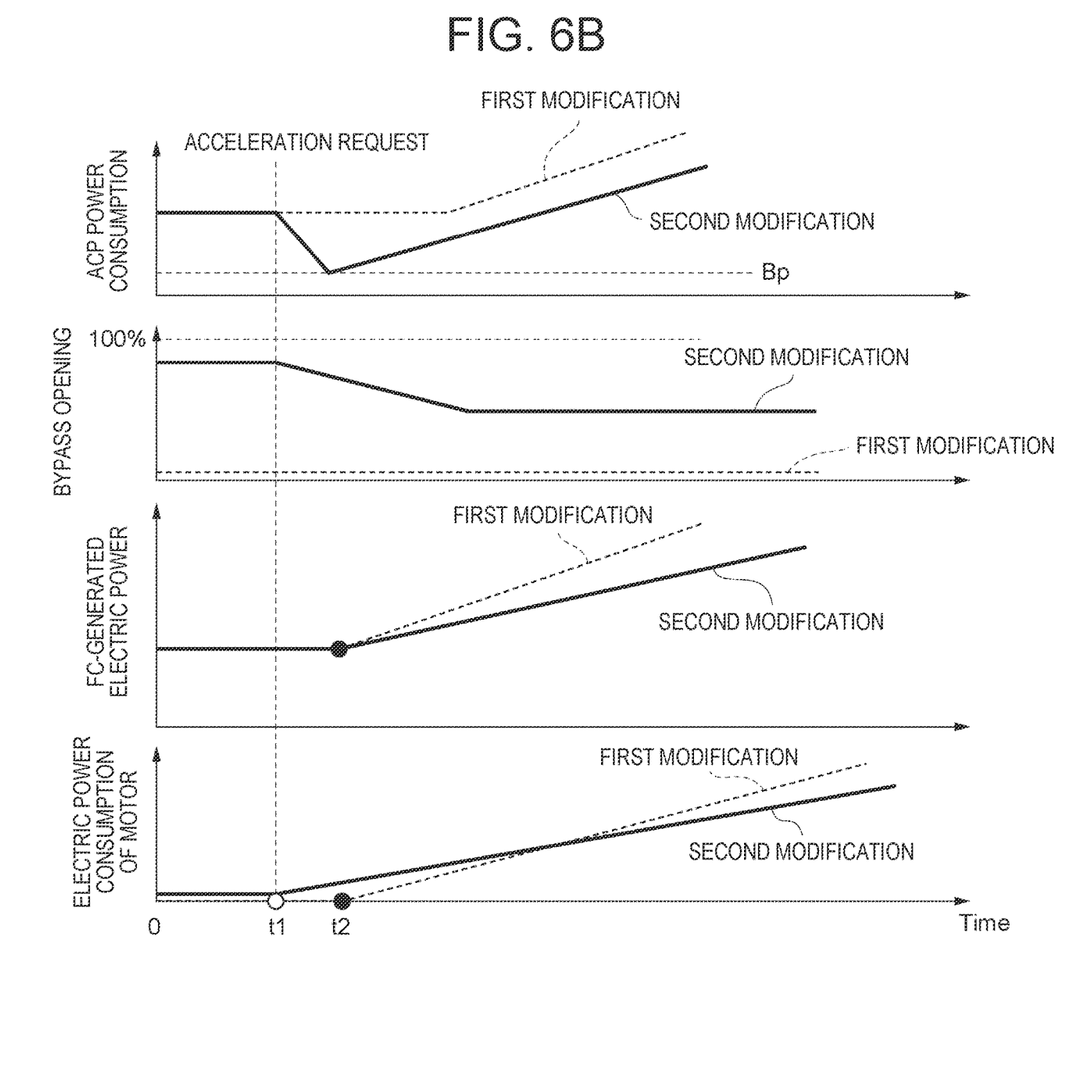
FIG. 6B is a time chart corresponding to a second modification.

A description is now given of a second modification different from the control flow described before. FIG. 6B is a time chart depicting the second modification. As a comparison with the first modification described before, a broken line represents the first modification and a solid line represents the second modification in FIG. 6B.

The second modification illustrated in FIG. 6B is different from the first modification illustrated in FIG. 6A in the point that the electric power supplied to the air compressor is reduced when the vehicle acceleration request is made. To be specific, at the time of the vehicle acceleration request (time t1 illustrated in FIG. 6B), the electric power supplied from the fuel cell to the air compressor starts to be reduced and the electric power the amount of which corresponds to the amount of the reduction in the electric power that is generated by the fuel cell and to be supplied to the air compressor is supplied to the drive motor. As a result, the power generated in the fuel cell can be supplied to the drive motor, so that the acceleration responsiveness of the drive motor can be improved from that in the first modification. In particular, in the first modification, the start of acceleration of the drive motor is delayed for the time of air response delay (see FIG. 6A) (motor acceleration is started at time t2 illustrated in FIG. 6A); meanwhile, in the second modification, as illustrated in FIG. 6B, the electric power consumption of the drive motor increases at time t1 prior to time t2, so that the acceleration responsiveness of the drive motor can be enhanced. It may be unnecessary to supply, to the drive motor, all the amount of the reduction in the electric power that is generated by the fuel cell and to be supplied to the air compressor.

Third Modification

Figure 7:
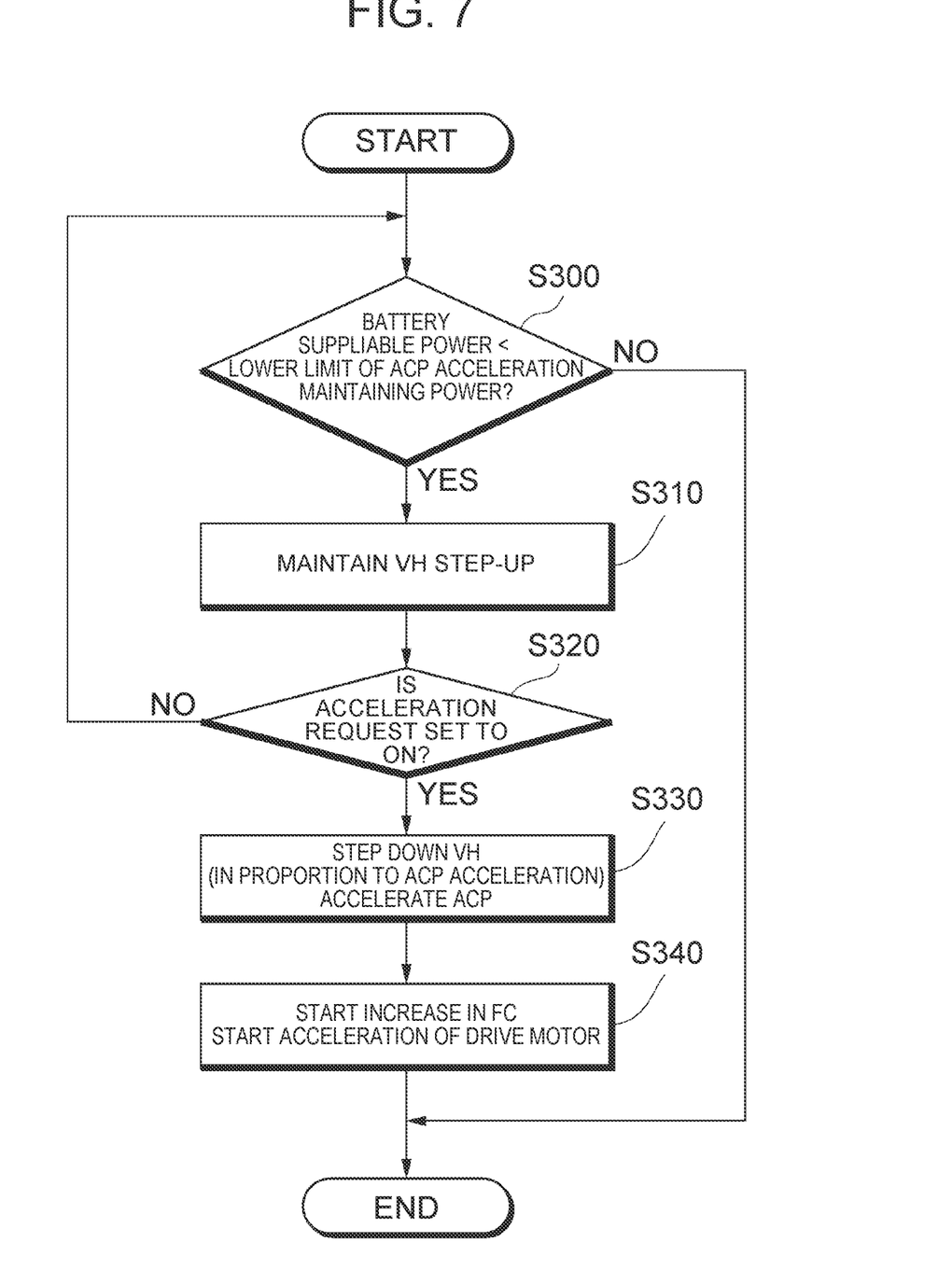
FIG. 7 is a flowchart illustrating a third modification of the control flow executed by the control unit illustrated in FIG. 1.
Figure 8:
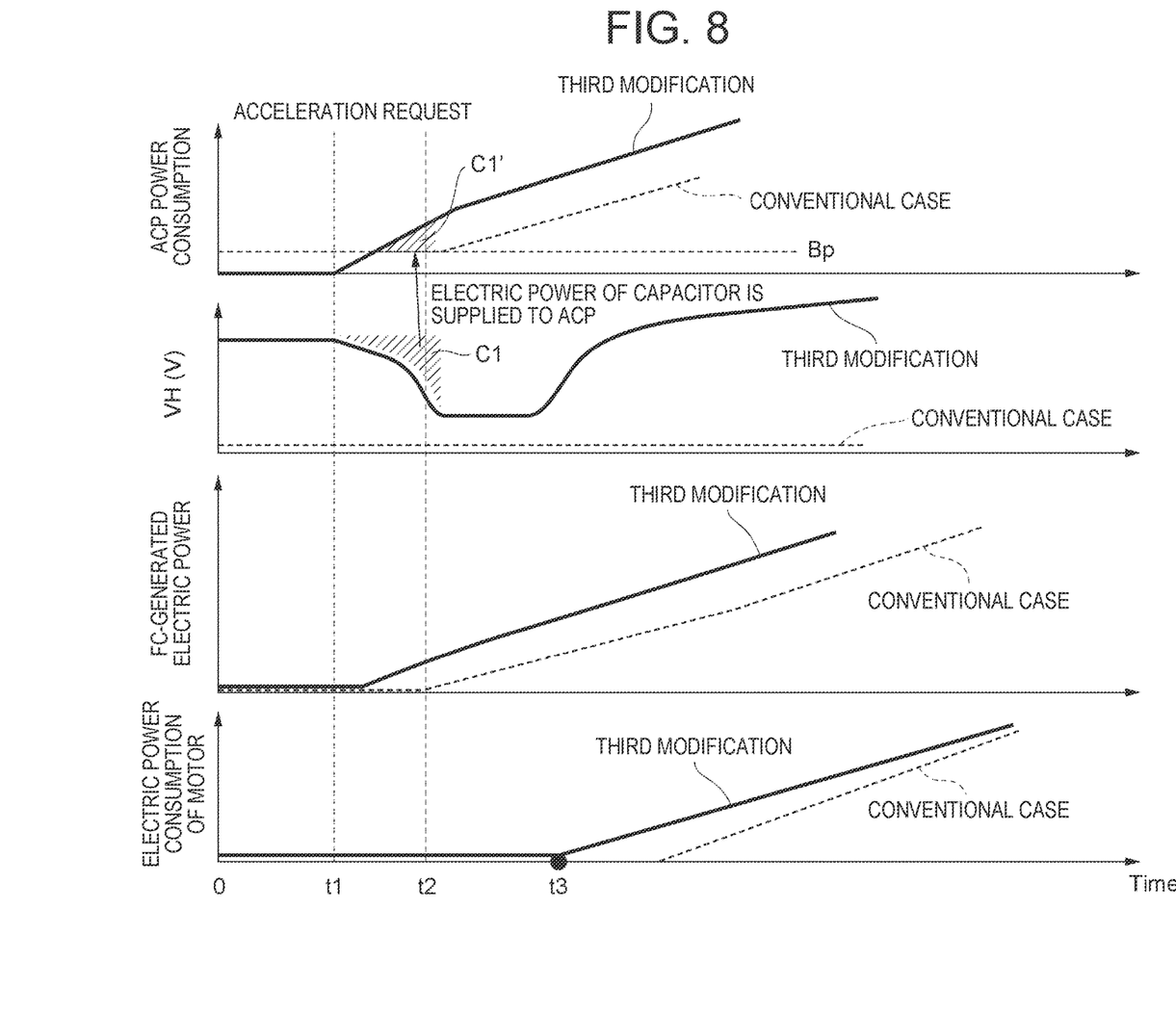
FIG. 8 is a time chart corresponding to the third modification.

A description is now given of a third modification different from the aforementioned control flow. FIG. 7 is a flowchart for describing the third modification of the control flow executed by the control unit 60. FIG. 8 is a time chart corresponding to the control flow illustrated in FIG. 7. The third modification is particularly different from the aforementioned control flow in the point that the capacitor is used.

First, as illustrated in step S300 of FIG. 7, it is determined whether or not the electric power (battery suppliable electric power) that the secondary battery can supply to the air compressor is less than a lower limit of air compressor acceleration maintaining electric power (a lower limit of ACP acceleration maintaining electric power). When the battery suppliable electric power is not less than the lower limit (step S300 (NO)), the control flow illustrated in FIG. 7 is ended. When the battery suppliable electric power is less than the lower limit (step S300 (YES)), the processing proceeds to step S310.

Next, in step S310 of FIG. 7, before the vehicle acceleration request is made (in a period (0≤t≤t1) of FIG. 8), the capacitor (for example, a second capacitor 41 illustrated in FIG. 1) is maintained in a step-up state (standby state). Although a voltage value (step-up value) in the standby state is set to, for example, 650V, the voltage value in the standby state is not limited to this, and any value can be used.

Next, in step S320 of FIG. 7, it is determined whether or not the vehicle acceleration request is present. When it is determined that the vehicle acceleration request is not present, the processing returns to step S300, and steps S300 to S310 are repeated until the vehicle acceleration request is made. When it is determined that the vehicle acceleration request is present (time t1 in FIG. 8), the processing proceeds to step S330.

Next, in step S330 of FIG. 7, as illustrated in the period (t1≤t≤t2) in FIG. 8, the capacitor is stepped down, and electric power is supplied to the air compressor from the capacitor. The electric power corresponding to the stepped-down voltage of the capacitor (C1 illustrated in FIG. 8) is equivalent to the electric power requested to accelerate the air compressor (C1' illustrated in FIG. 8). Thus, supplying the electric power corresponding to the stepped-down voltage of the capacitor to the air compressor increases electric power consumption of the air compressor at the time when the vehicle acceleration request is made (time t1). Then, with the increase in electric power consumption of the air compressor, the generated electric power of the fuel cell increases. Then, at time t3 of FIG. 8, acceleration of the drive motor starts (step S340 of FIG. 7).

Since some of the electric power generated in the fuel cell is used for voltage step-up of the capacitor in order to step up the voltage of the capacitor again, the motor power decreases after the start-up. A VH voltage step-down command value in step S330 is calculated by a following expression:

$$\Delta V = -VH + \sqrt{VH^2 + 2 \times dt/C \times P_{ACP}}$$

In the expression, VH represents a motor inverter supply voltage (V), ΔV represents voltage drop speed (voltage drop per one operation period) (V), dt represents an operation period (see), $P_{ACP}$ represents an air compressor request power (W), and, C represents capacitor capacitance (F).

The embodiment of the present disclosure has been described with reference to illustrative examples. However, the present disclosure is not limited to these illustrative examples. For example, in the aforementioned embodiment, when it is determined that the electric power that can be supplied from the secondary battery to the air compressor is less than the lower limit of the air compressor acceleration maintaining electric power, the control unit may make at least one of the air compressor and the auxiliary unit consume the electric power generated in the fuel cell and, upon a vehicle acceleration request, the electric power to be consumed by at least one of the air compressor and the auxiliary unit may be used for acceleration of the air compressor. Design modifications of the illustrative examples properly made by those skilled in the art without departing from the characteristics of the present disclosure are also embraced in the scope of the claims of the present disclosure. Elements included in each of the illustrative examples and their arrangement, materials, conditions, forms, sizes and the like are not limited to those disclosed in the illustrative examples, but may be changed accordingly.

What is claimed is:

1. A voltage control device for a fuel-cell vehicle including a fuel cell and a secondary battery as a power supply source for a drive motor that drives the vehicle, the voltage control device comprising:
   an air compressor configured to supply air to the fuel cell; and
   a control unit configured to control electric power generated by the fuel cell, wherein
   when the control unit determines that electric power suppliable from the secondary battery to the air compressor is less than a lower limit of an acceleration maintaining-electric power of the air compressor, the control unit maintains a state where the electric power generated by the fuel cell is consumed by an electric power drive provided in the vehicle, and supplies the electric power to be consumed by the electric power drive to the air compressor when a vehicle acceleration request is made.

2. The voltage control device for a fuel-cell vehicle according to claim 1, wherein
   the electric power drive is an auxiliary machine, and
   the control unit is configured to reduce electric power consumption of the auxiliary machine and supply an amount of electric power corresponding to an amount of reduction of the electric power consumption to the air compressor so as to accelerate the air compressor, when the vehicle acceleration request is made.

3. The voltage control device for a fuel-cell vehicle according to claim 1, wherein the electric power drive is the air compressor, and the control unit is configured to reduce an opening amount of a valve provided in a bypass channel that connects a cathode inlet-side channel and a cathode outlet-side channel of the fuel cell while bypassing the fuel cell, when the vehicle acceleration request is made.

4. The voltage control device for a fuel-cell vehicle according to claim 1, wherein the control unit is configured to reduce the electric power supplied from the fuel cell to the air compressor and supplies at least part of electric power corresponding to an amount of the reduction of the electric power from the fuel cell to the drive motor, when the vehicle acceleration request is made.

5. A voltage control device for a fuel-cell vehicle including a fuel cell and a secondary battery as a power supply source for a drive motor that drives the vehicle, the voltage control device comprising:

an air compressor configured to supply air to the fuel cell;

a capacitor capable of retaining electric power necessary for acceleration of the air compressor, and a control unit configured to control electric power generated by the fuel cell, wherein when the control unit is determines that electric power suppliable from the secondary battery to the air compressor is less than a lower limit of an acceleration maintaining-electric power of the air compressor, the control unit maintains the capacitor in a step-up state, and supplies the stepped-up electric power of the capacitor to the air compressor so as to accelerate the air compressor, when a vehicle acceleration request is made.

6. A voltage control device for a fuel-cell vehicle including a fuel cell and a secondary battery as a power supply source for a drive motor that drives the vehicle, the voltage control device comprising:

an air compressor configured to supply air to the fuel cell;

an auxiliary machine configured to consume electric power generated by the fuel cell; and a control unit programmed to control electric power generated by the fuel cell, wherein when the control unit determines that electric power suppliable from the secondary battery to the air compressor is less than a lower limit of an acceleration maintaining-electric power of the air compressor, the control unit is programmed to cause at least one of the air compressor and the auxiliary machine to consume the electric power generated by the fuel cell, and use the electric power to be consumed for acceleration of the air compressor when a vehicle acceleration request is made.

* * * * *